May 13, 1930. R. C. EVANS 1,758,739
ANTISKID TIRE CHAIN
Filed May 4, 1928
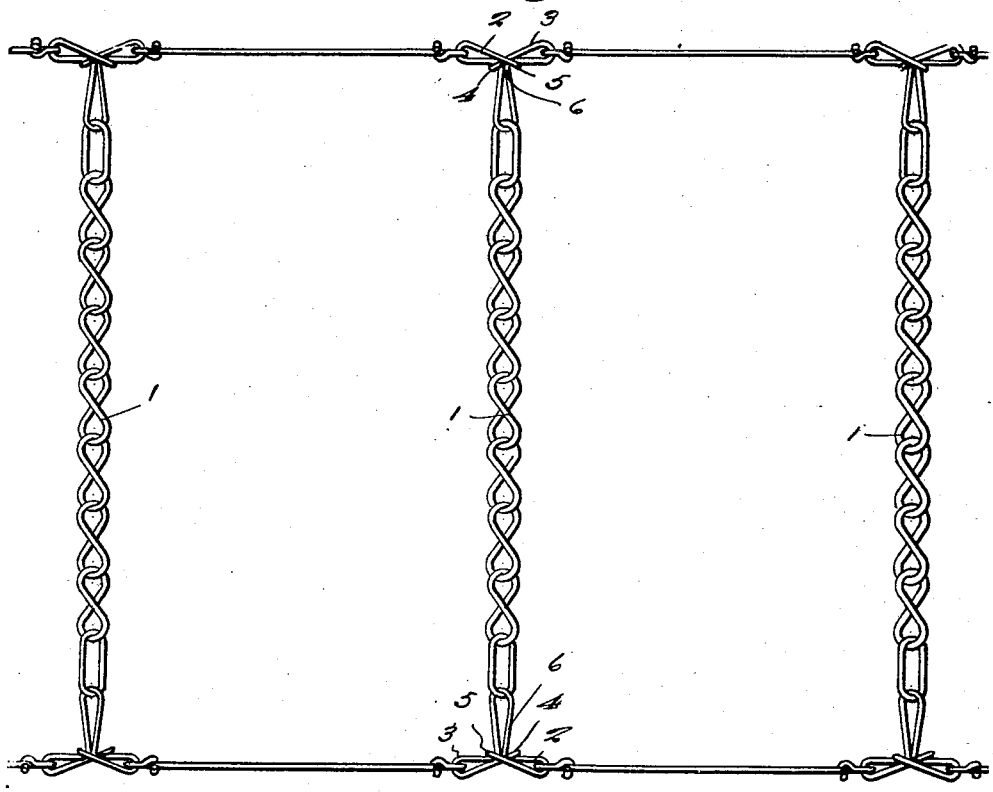
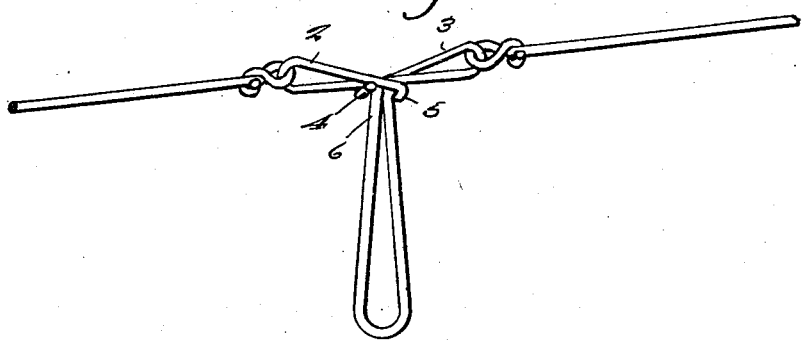

Patented May 13, 1930

1,758,739

UNITED STATES PATENT OFFICE

RAY C. EVANS, OF NORTH RIVER, VIRGINIA

ANTISKID TIRE CHAIN

Application filed May 4, 1928. Serial No. 275,105.

My invention relates to chain links adapted especially for use in tire chains. The object of the invention is the provision of a novel and improved link to be used in the longitudinal side chains of a tire chain structure for the connection of the cross or tread chains, in order to afford a convenient assemblage of the longitudinal and cross chains. With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

In carrying out my invention, I provide a pair of side chains formed of links made of a single strand of wire, having a curled end to form a loop at each end to afford a flexible connection with the several cross chains and I provide at each end of each cross chain a link of peculiar construction, composed of a single strand of stout wire bent to form a loop at its middle and to form a pair of outwardly pointing loops at right angles thereto with the terminal ends of the wire curled around to form a locking point at the neck of the first mentioned loop. A skid chain equipped with side chains as described and interlinked with the several cross chains by a triangular three pointed loop as described constitutes an armour for a wheel which will lie smooth on the pneumatic tire without tendency to bruise the surface.

The several features of the invention will be more fully hereinafter described and the novel features particularly pointed out in the accompanying claim.

In the accompanying drawing illustrating the invention:—

Figure 1 is a plan view of a part of skid chain embodying my improvements and

Figure 2 is a detailed view showing a peculiar three looped connector between the side chains and the cross chains.

Referring now in particular to the drawings—1 represents a group of cross chains formed of a plurality of closed links adapted to embrace a pneumatic tire transversely. At each end of these cross chains is a three looped connecting link, two of the three being in alignment and a third lying at right angles thereto; this three link connector is formed of a single piece of stout wire bent at the middle into a loop form and drawn together to form a neck and the two ends bent at right angles and looped in alignment of each other, as indicated at 2—3. The ends 4—5 being given a quick bend to form a lock loop around the neck 6 of the loop connected with the cross-chain. The side chains are formed of connected links each connected with the several cross chains having their ends bent and formed into a strong eye by right angular bends around the body of the link.

Having thus described my invention, what I claim is new and desire to secure by Letters Patent, is:—

A chain link fastening for tire chains comprising aligned and right-angularly disposed loops respectively, the latter mentioned loop being of elongated formation, and both ends of the link body completing the aligned loops being locked about the neck portion of the right-angularly disposed elongated loop intersecting the aligned loops to prevent any of the loops from becoming accidentally displaced from its point of connection.

In testimony whereof I affix my signature.

RAY C. EVANS.